United States Patent
Konishi

(10) Patent No.: US 8,416,442 B2
(45) Date of Patent: Apr. 9, 2013

(54) COMMUNICATION SYSTEM, TRANSMITTER, RECEIVER, AND COMPUTER READABLE MEDIUM STORING COMMUNICATION PROGRAM FOR SIGNAL CORRECTION ACCORDING TO A PHYSICAL QUANTITY OF THE SIGNAL TRANSMISSION PATH

(75) Inventor: Yasuaki Konishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 757 days.

(21) Appl. No.: 12/626,781

(22) Filed: Nov. 27, 2009

(65) Prior Publication Data

US 2010/0321721 A1 Dec. 23, 2010

(30) Foreign Application Priority Data

Jun. 23, 2009 (JP) ................................. 2009-148846

(51) Int. Cl.
*G06F 3/12* (2006.01)
*G06K 15/00* (2006.01)

(52) U.S. Cl. ...................................... 358/1.15; 358/1.14

(58) Field of Classification Search .................... 358/1.1, 358/1.9, 1.12, 1.13, 1.14, 1.15, 401; 455/67.14, 455/516

See application file for complete search history.

(56) References Cited

U.S. PATENT DOCUMENTS

| 7,936,845 B2 * | 5/2011 | Yoshida et al. | 375/316 |
| 7,986,147 B1 * | 7/2011 | Lo | 324/533 |
| 2008/0034048 A1 * | 2/2008 | Shabtau et al. | 709/206 |
| 2008/0095219 A1 | 4/2008 | Yoshida et al. | |
| 2009/0273801 A1 * | 11/2009 | Steele et al. | 358/1.15 |

FOREIGN PATENT DOCUMENTS

JP A 2008-103951 5/2008

* cited by examiner

*Primary Examiner* — Gabriel Garcia
(74) *Attorney, Agent, or Firm* — Oliff & Berridge, PLC

(57) ABSTRACT

The present invention provides a communication system including: a transmitter section that transmits a signal having a predetermined waveform; plural receiver sections that receive the signal via signal transmission paths; a physical quantity measuring section that measures a physical quantity of the signal transmission paths, based on the transmission time of the signal from the transmitter section to the receiver section; a correction section that corrects a signal received via the signal transmission paths, and corrects a signal transmitted from the transmitter section and outputs the signal to the signal transmission path; and a setting section that sets, in the correction section, a correction amount in accordance with the physical quantity for correcting a signal received via the signal transmission path, and/or a correction amount in accordance with the physical quantity for correcting a signal transmitted from the transmitter section and outputting to the signal transmission path.

9 Claims, 13 Drawing Sheets

LENGTH OF CABLE $13_3$ < LENGTH OF CABLE $13'_3$

FIG.12

| DISTANCE (CABLE LENGTH) | PE73 | EQ75 |
|---|---|---|
| 5 | 0 | 1 |
| 10 | 0 | 2 |
| 15 | 1 | 2 |
| 20 | 2 | 2 |

FIG.13

| DISTANCE (CABLE LENGTH) | PE73 | EQ75 |
|---|---|---|
| 5 | 1 | 0 |
| 10 | 2 | 0 |
| 15 | 2 | 1 |
| 20 | 2 | 2 |

US 8,416,442 B2

COMMUNICATION SYSTEM, TRANSMITTER, RECEIVER, AND COMPUTER READABLE MEDIUM STORING COMMUNICATION PROGRAM FOR SIGNAL CORRECTION ACCORDING TO A PHYSICAL QUANTITY OF THE SIGNAL TRANSMISSION PATH

CROSS-REFERENCE TO RELATED APPLICATION

This application is based on and claims priority under 35 USC 119 from Japanese Patent Application No. 2009-148846 filed Jun. 23, 2009.

BACKGROUND

Technical Field

The present invention relates to a communication system, a transmitter, a receiver, and a computer readable medium storing a communication program.

SUMMARY

According to an aspect of the invention, there is provided a communication system including: a transmitter section that transmits a signal having a predetermined waveform; a plurality of receiver sections that receive the signal via signal transmission paths; a physical quantity measuring section that measures a physical quantity of the signal transmission path for each of the plurality of receiver sections, based on the transmission time of the signal from the transmitter section to the receiver section; a correction section that corrects a signal received via the signal transmission path such that the signal received has the predetermined waveform, and corrects a signal transmitted from the transmitter section and outputs the signal to the signal transmission path such that the signal for output has the predetermined waveform; and a setting section that sets, in the correction section, at least one of, a correction amount in accordance with the physical quantity for correcting a signal received via the signal transmission path, and/or a correction amount in accordance with the physical quantity for correcting a signal transmitted from the transmitter section and outputting to the signal transmission path.

BRIEF DESCRIPTION OF THE DRAWINGS

Exemplary embodiments of the present invention will be described in detail based on the following figures, wherein:

FIG. 12 is an explanatory diagram for explaining an example of a LUT when an EQ alone is changed according to the second exemplary embodiment;

FIG. 13 is an explanatory diagram for explaining an example of a LUT when a PE alone is changed according to the second exemplary embodiment;

DETAILED DESCRIPTION

Herebelow, an example of an exemplary embodiment of the present invention will be described in detail with reference to the drawings.

[First Exemplary Embodiment]

Explanation will now be given of details of an exemplary embodiment of the present invention, with reference to the drawings. Explanation will be given of details in a first exemplary embodiment of an image forming system provided with a control device and image forming devices. The control device transmits image data of an image for forming and a control signal relating to image forming. The image forming devices receive the image data and control signal and form images.

Figure 1:
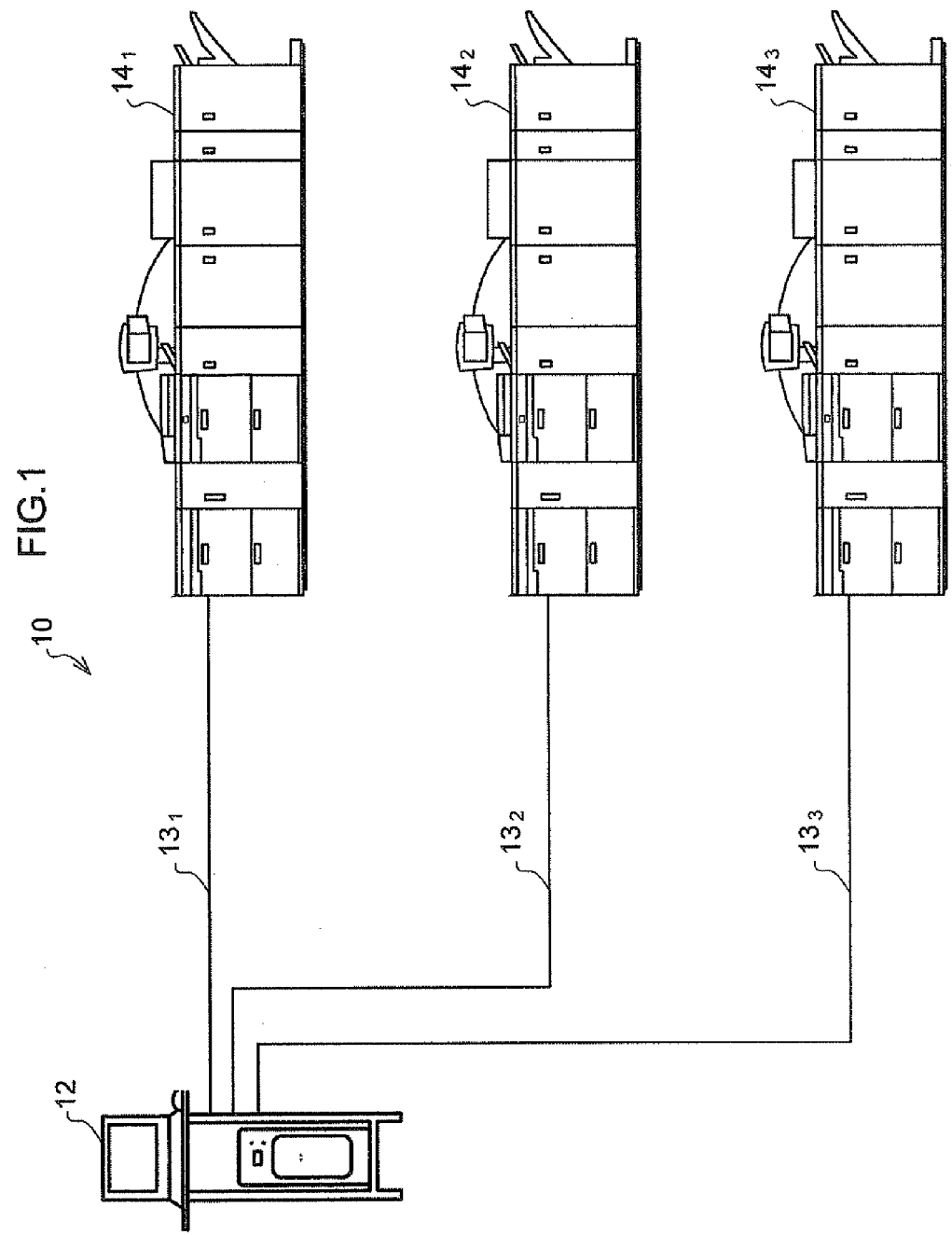
FIG. 1 is a configuration diagram showing an example of a schematic configuration of an image forming system according to a first exemplary embodiment.

FIG. 1 shows a schematic configuration diagram of an example of an image forming system of the first exemplary embodiment. An image forming system 10 of the first exemplary embodiment includes a control device 12, plural (three in the specific example shown in FIG. 1) image forming devices 14₁ to 14₃ controlled by the control device 12. When explanation is given the individual image forming devices 14₁ to 14₃ then suffixes (1 to 3) will be appended thereto in order to discriminate therebetween. On the other hand, when there is no need to discriminate between the individual image forming devices, they will be referred to as image forming device (s) 14, without the suffix.

The control device 12 and the image forming devices 14 of the first exemplary embodiment are connected together by cables 13, which are transmission paths of signals. In the first exemplary embodiment, the lengths of the cables connecting the individual image forming devices 14 to the control device 12 are each different lengths. There is no particular limitation to the cables 13, as long as they can be used for signal transmission and reception.

Figure 2:
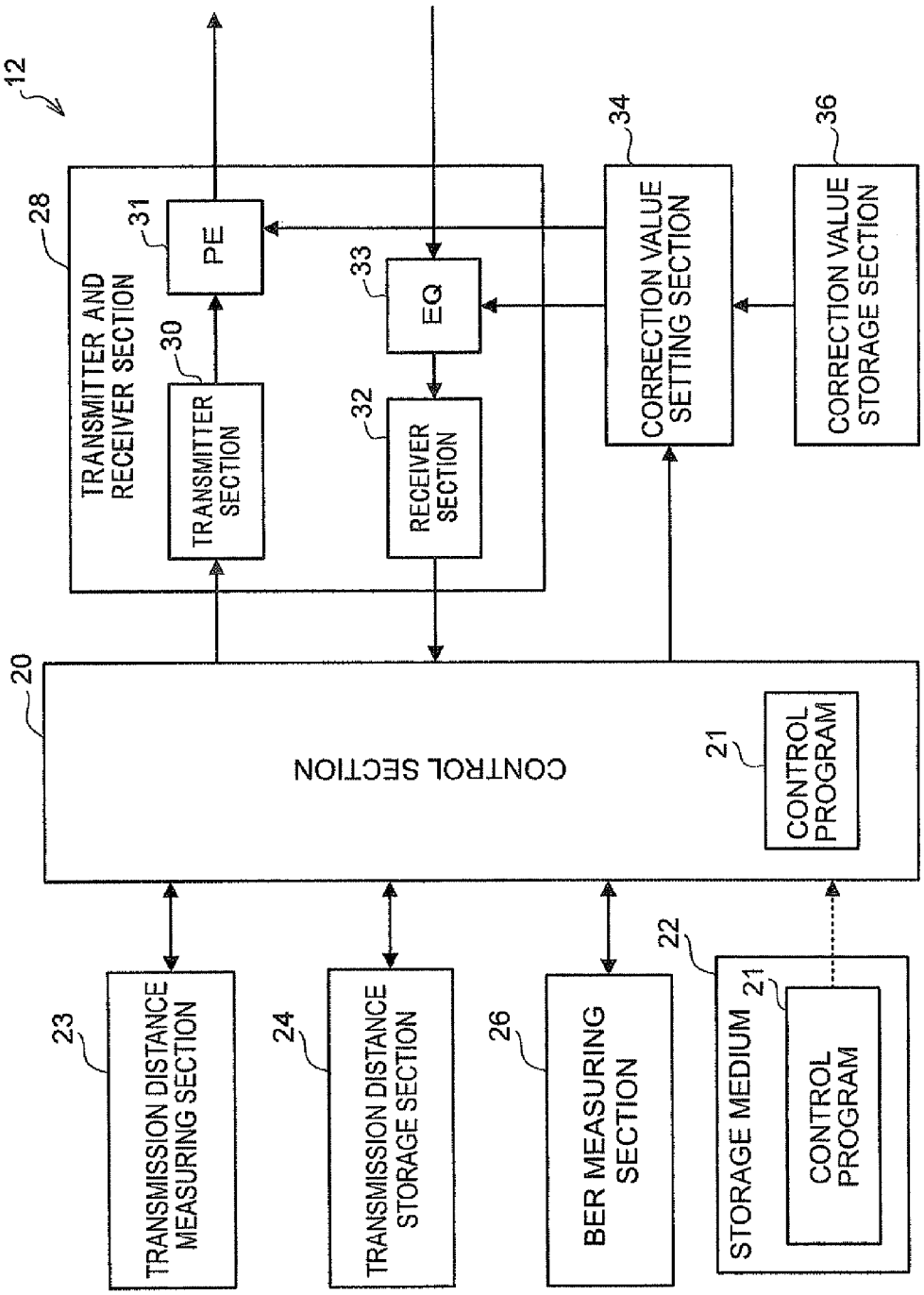
FIG. 2 is a functional block diagram showing an example of a schematic configuration of a control device in an image forming system according to the first exemplary embodiment.

FIG. 2 shows a functional block diagram of an example of a schematic configuration of the control device 12. The control device 12 of the first exemplary embodiment includes: a control section 20, a transmission distance measuring section 23, a transmission distance storage section 24, a BER measuring section 26, a transmitter and receiver section 28, a correction value setting section 34, and a correction value storage section 36.

The control section 20 controls the control device 12 overall, and is, specifically, configured with a CPU, ROM, RAM, and the like. A control program 21, for executing processing that is described later, is stored in the control section 20. The first exemplary embodiment is configured with the control section 20 stored in the control program 21 in advance. However, the exemplary embodiment of the present invention is not limited to such a configuration, and the control program 21 may be stored on a storage medium 22 or the like, such as a CD-ROM, removable disk or the like, and installation may be performed by loading the control program 21 to the control section 20 from the storage medium 22.

The transmission distance measuring section 23 measures the length of the cables $13_1$ to $13_3$. In the first exemplary embodiment, as an example, a clock signal is sent from a transmitter and receiver section 28 to each of the image forming devices 14, and the time taken until the respective clock signals return from the image forming devices 14 is detected, and the length of the cables is measured by converting the detected time into distance.

More specifically, in the first exemplary embodiment, a clock signal for measurement is employed that has 1 CLK (clock)=200 ps for 5 G ps. Since the speed of light is $3\times10^8$ m/s, the propagation distance of 1 CLK is $3\times10^8\times200\times10^{-12}$=0.06 m. In the transmission distance measuring section 23 the predetermined control signal is transmitted to the image forming devices 14, and the number of clocks is counted until receipt of the returning predetermined control signal. The transmission distance measuring section 23 then converts the number of clocks counted into a distance, based on the propagation distance of 1 CLK. Since the transmission distance measuring section 23 has counted the time for an out and return journey, the distance from the control device 12 to the image forming devices 14 is determined by either converting half the number of clocks into a distance, or by taking half of the distance arrived at from converting all of the clocks. Since the time is counted for an out and return journey that generates twice the time difference of a single journey, measurement may be made with the above method to a precision of an error of about 3 cm.

In the above determination method, a control signal is employed with a predetermined 1 CLK. However, in practice it is not known whether 1 CLK has been transmitted to the image forming devices 14. Therefore, a control signal of 2 CLK, or 4 CLK may be used in actual measurement.

Note that in the first exemplary embodiment, in one of the image forming devices 14, when a receiver section 48 of a transmission and receiver section 44 receives a clock signal for measurement, including a predetermined control signal, the control section 40 of the image forming device 14 transmits the clock signal for measurement without alternation to the source driver section 12 using a transmitter section 46. However, the image forming devices 14 are not limited thereto, and an image forming device 14 may be configured with a detection section that detects the clock signal for measurement.

The transmission distance storage section 24 stores the length of the cables 13, measured by the transmission distance measuring section 23, associated with the respective image forming devices 14. The transmission distance storage section 24 is, for example, realized by a memory, a hard disk, or the like.

The BER measuring section 26 determines the Bit Error Rate (referred to below as BER) as a measure of the deterioration of the signal transmitted and received between the control device 12 and the image forming device 14. The BER measuring section 26 in the first exemplary embodiment, transmits a predetermined signal for measurement to the image forming device 14, using the transmitter section and receiver section 28, and determines the Bit Error Rate of the signal for measurement that has returned from the image forming device 14.

The transmission and receiver section 28 includes a transmitter section 30, a PE 31, a receiver section 32, and an EQ 33. The transmitter and receiver section 28 transmits and receives the control signal, a signal representing image data, and various other signals, to and from the image forming devices 14 through the cables 13. Specifically, the transmitter and receiver section 28 is an interface or the like.

The transmitter section 30 outputs an instruction signal from the control section 20 to the PE 31. After correcting in the PE 31 for signal deterioration, the transmitter and receiver section 28 transmits the corrected signal to the image forming device 14 designated by the control section 20.

When transmitting, the PE 31 corrects signals using a so-called Pre-Emphasis (referred to below as PE) method. Generally the quality of a transmission signal deteriorates according to peculiarities in the signal path for transmission (cable 13). Therefore, when receipt, the waveform of a signal may have a waveform with more flattened shoulder portions (rise-up, and fall-off) in comparison to the transmitted waveform. When transmitting, the PE 31 emphasis a signal for transmission at portions of the signal waveform corresponding to the shoulders. Due to this, the waveform of the transmitted signal on receipt becomes the correct waveform (the waveform which should be received if there were to be no deterioration in quality).

A signal received from the image forming device 14 is input to the control section 20 after correction of signal deterioration in the EQ 33.

When receiving, the EQ 33 corrects signals using a so-called Equalizer (referred to below as EQ) method. When a quality-deteriorated signal is received, the EQ 33 emphasis the received signal at portions corresponding to the shoulders of the waveform. By so doing, a correct waveform is achieved for the received signal (the waveform which should be received if there were to be no deterioration in quality).

In the first exemplary embodiment, the control device 12 transmits the control signal, a signal representing image data, and various other signals to the image forming devices 14. Since the control device 12 mainly transmits signals, configuration may be made in which the signals for transmission alone are corrected by the PE 31. In such cases, the control device 12 may be configured without the EQ 33.

Under control of the control section 20, the correction value setting section 34 sets correction values, for correcting signals, in the PE 31 and the EQ 33 for each of the image forming devices 14. The correction value storage section 36 stores the correction values for the PE 31 and EQ 33, which were set by the correction value setting section 34 for each of the image forming devices 14. The correction value storage section 36 is, for example, realized by a memory, hard disk or the like.

Figure 3:
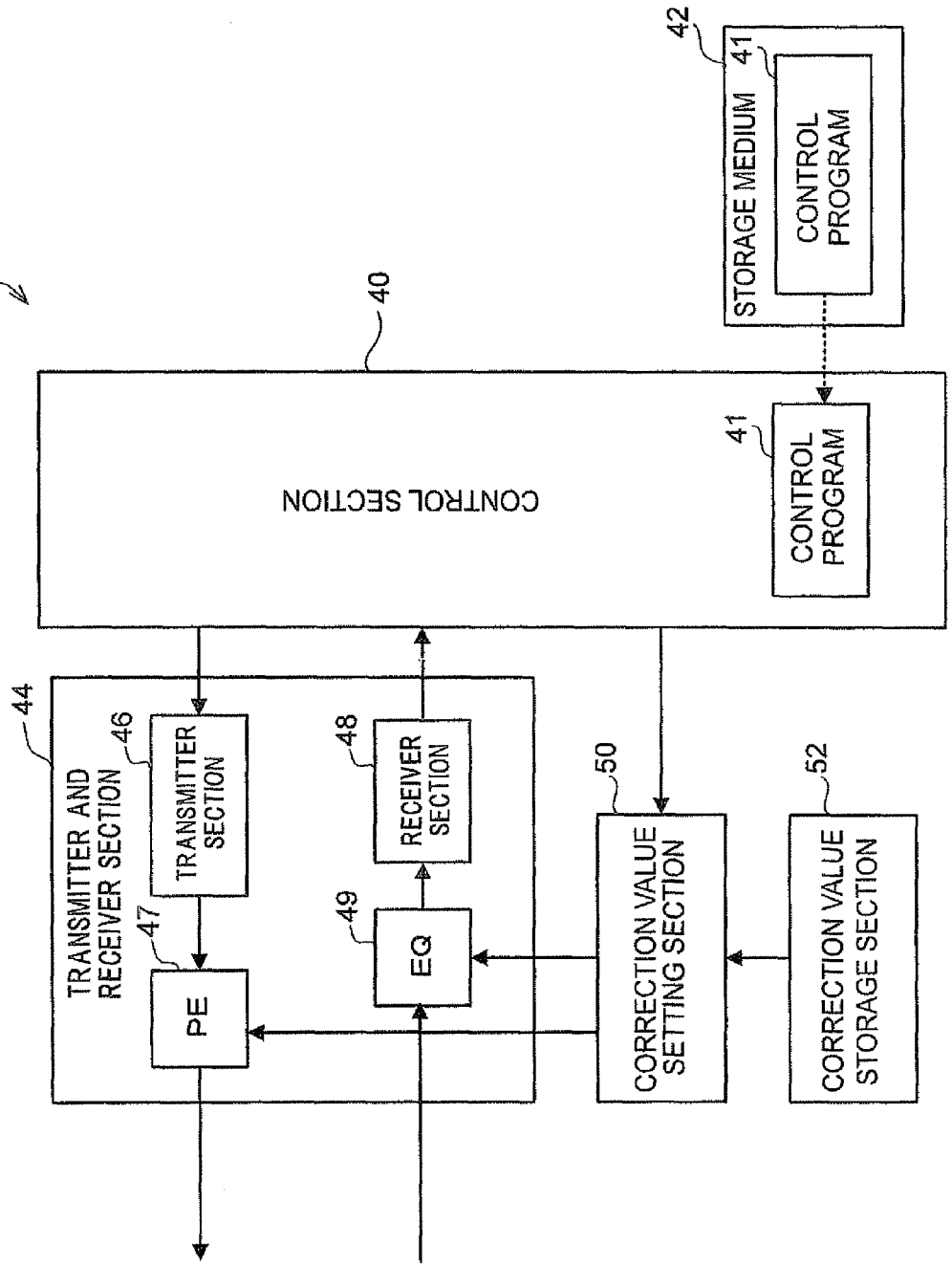
FIG. 3 is a functional block diagram showing an example of a schematic configuration of an image forming device in an image forming system according to the first exemplary embodiment.

A functional block diagram of an example of a schematic configuration of one of the image forming devices 14 is shown in FIG. 3. The control device 12 of the first exemplary embodiment includes a control section 40, a transmitter and receiver section 44, a correction value setting section 50, and a correction value storage section 52. The image forming device 14 is equipped with an image forming section (not shown in the figures) for forming an image on a recording medium based on a signal received from a control device 12. A specific example of such an image forming section is a printer or the like.

The control section 40 controls the image forming device 14 overall. The control section 40 is, specifically, configured with a CPU, ROM, RAM or the like. A control program 41 is stored in the control section 40, for executing processing corresponding to the processing executed in the control section 20 of the control device 12, as described later. The first exemplary embodiment is configured with the control program 41 stored in the control section 40 in advance. However, the control program 41 is not limited to such a configuration, and the control program 41 may be stored on a storage medium 42, such as a CD-ROM, removable disk, or the like, and installation may be performed by loading the control program 41 from the storage medium 42 to the control section 40.

A transmission and receiver section 44, a transmitter section 46, a PE 47, a receiver section 48, and an EQ 49 in the image forming device 14 correspond to the transmission and receiver section 28, the transmitter section 30, the PE 31, the receiver section 32, and the EQ 33 in the control device 12, respectively. A correction value setting section 50 and a correction value storage section 52 in the image forming device 14 correspond to the correction value setting section 34 and the correction value storage section 36 in the control device 12, respectively. Consequently, detailed explanation of the corresponding sections in the image forming device 14 will be omitted.

In the first exemplary embodiment, the image forming devices 14 receive the control signal, the signal representing image data, and other various signals from the control device 12 and form images. Since the image forming device 14 mainly receives signals, a configuration may be made in which the received signals alone are corrected by the EQ 49. In such cases, the image forming device 14 may be configured without the PE 47.

Figure 4:
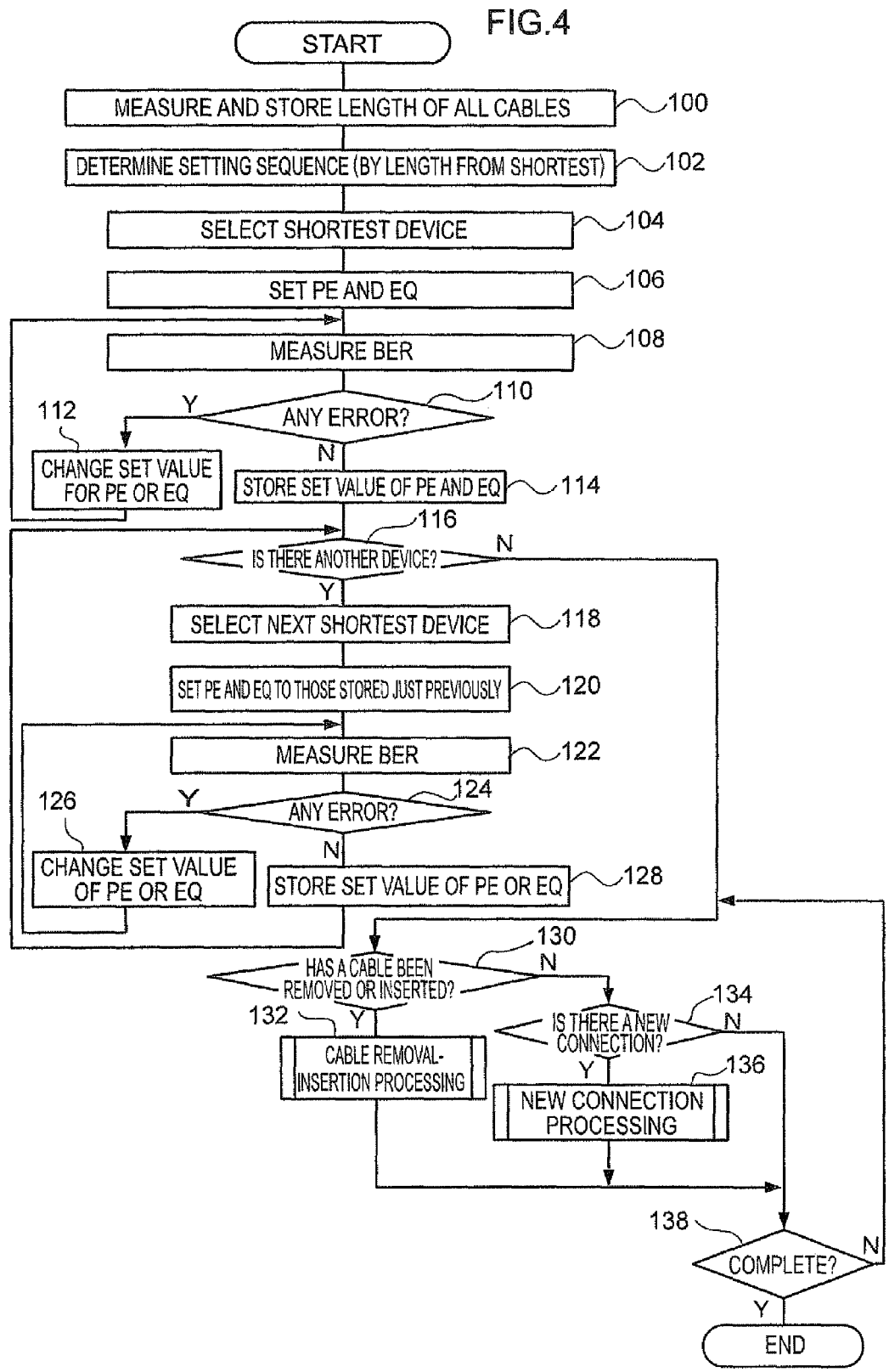
FIG. 4 is a flow chart showing an example of processing executed in a control section of a control device according to the first exemplary embodiment.

Explanation will now be given of processing executed in the control section 20 of the control device 12 for setting correction values for correcting signals for transmission. A flow chart of an example of processing executed in the control section 20 is shown in FIG. 4. The present processing is executed when a power source (not shown in the drawings) is introduced to the control device 12.

In step 100, control section 20 instructs measurement of the lengths of the cables 13 by the transmission distance measuring section 23 and storage thereof in the transmission distance storage section 24. Namely, the transmission distance measuring section 23 measures the lengths of the cables 13₁ to 13₃, associates these measured lengths with the image forming devices 14₁ to 14₃ and stores these measured lengths in the transmission distance storage section 24.

At the next step 102, the control section 20 determines the sequence for the correction value setting section 34 to set the correction values. In the first exemplary embodiment, the control section 20 determines the sequence for setting the correction values to be from the shortest length of cable 13 upward in length.

At the next step 104, in accordance with the determined sequence, the control section 20 selects the image forming device 14 to which the shortest length of cable 13 is connected.

At the next step 106, the control section 20 sets the correction values for the PE 31 of the control device 12 and the EQ 49 of the image forming device 14. Note that, the control section 20 may set a general value, a value arrived at by prior experimentation, a value of 0, or the like.

In the first exemplary embodiment, when setting the correction value for the EQ 49 of the image forming device 14, the control section 20 transmits this correction value from the transmitter and receiver section 28 to the image forming device 14. The control section 40 of the image forming device 14 sets the correction value, received by the transmitter and receiver section 44, in the EQ 49 using the correction value setting section 50.

At the next step 108, the BER is measured by the BER measuring section 26. At the next step 110, determination is made as to whether or not there is any error in the measured result. Where error exists, determination is affirmative, the routine proceeds to step 112, and after changing the set value of the PE 31 and/or the EQ 49 the routine returns to step 108. The processing of step 108 and step 110 is then repeated. Note that at step 112, a change need only be made to the set value of at least one of the PE 31 or the EQ 49. Determination may be made in advance as to whether to change the set value of PE 31, change the set value of the EQ 49, or change both set values. Sometime there is an increase in noise included in the signal received by the image forming device 14 when correction is performed by the PE 31. Therefore, correction is preferably performed by the EQ 49 of the image forming device 14. Further, determination may be made in advance as to which set value to change. As a specific example of a method of changing, the set values may be increased or decreased by steps of a predetermined value.

When determination is made at step 110 that there is no error present then determination is negative and the routine proceeds to step 114. Note that, at this step, this does not only refer to there being absolutely no error, and when there is error present, but this error is within a predetermined allowable range, progression is also made to step 114 as if there were no error.

At step 114, the present set value of the PE 31 and the value of the EQ 49 are stored. Note that in the first exemplary embodiment, the set value of the PE 31 is stored in the correction value storage section 36. The set value of the EQ 49 is stored in the correction value storage section 52 of the image forming device 14. In addition, the set value of the EQ 49 is stored in the correction value storage section 36.

At the next step 116, determination is made as to whether or not there are any other image forming devices 14 to which setting has not yet been performed. When there is an image forming devices 14 to which setting has not yet been performed, determination is affirmative and the routine proceeds to step 118. At the next step 118, in accordance with the determined sequence, the image forming device 14 is selected to which the next shortest length of cable 13 is connected.

At the next step 120, the correction value of the PE 31 and the correction value of the EQ 49 of the image forming device 14 to which setting is being performed this time, are each respectively set to the correction values for the PE 31 and the EQ 49 most recently stored in the correction value storage section 36.

Note that, the next step 122 is substantially the same as step 108, the further next step 124 is substantially the same as step 110, when determination at step 124 is affirmative, the step 126 is substantially the same as step 112, when determination at step 124 is negative, the step 128 is substantially the same as step 114. After the processing of each of these steps is completed, the routine returns to step 116.

When determination is made at step 116 that there are no other devices to which correction value setting has not yet been performed, determination is negative and the routine proceeds to step 130. Namely, when a signal has been transmitted via the cables 13 to all of the image forming devices 14 connected to the control device 12, and when the correction values of the PE 31 and the EQ 49 for setting, corresponding to each of the respective image forming devices 14, have been stored in the correction value storage section 36, then the routine proceeds to step 130.

At step 130, determination is made as to whether or not there is a cable 13 that has been removed or inserted. In the first exemplary embodiment, as an example, when an error occurs in a single transmitted to or received from one of the image forming devices 14, then this is interpreted as the cable 13 for transmitting signals to this image forming device 14 having been removed or inserted. Note that the control device 12 is not limited to the above described configuration. The control device 12 may, for example, be configured to monitor the connection state of the cables 13, and to identify when a cable 13 has been removed, or when a cable 13 has been inserted.

Figure 5:
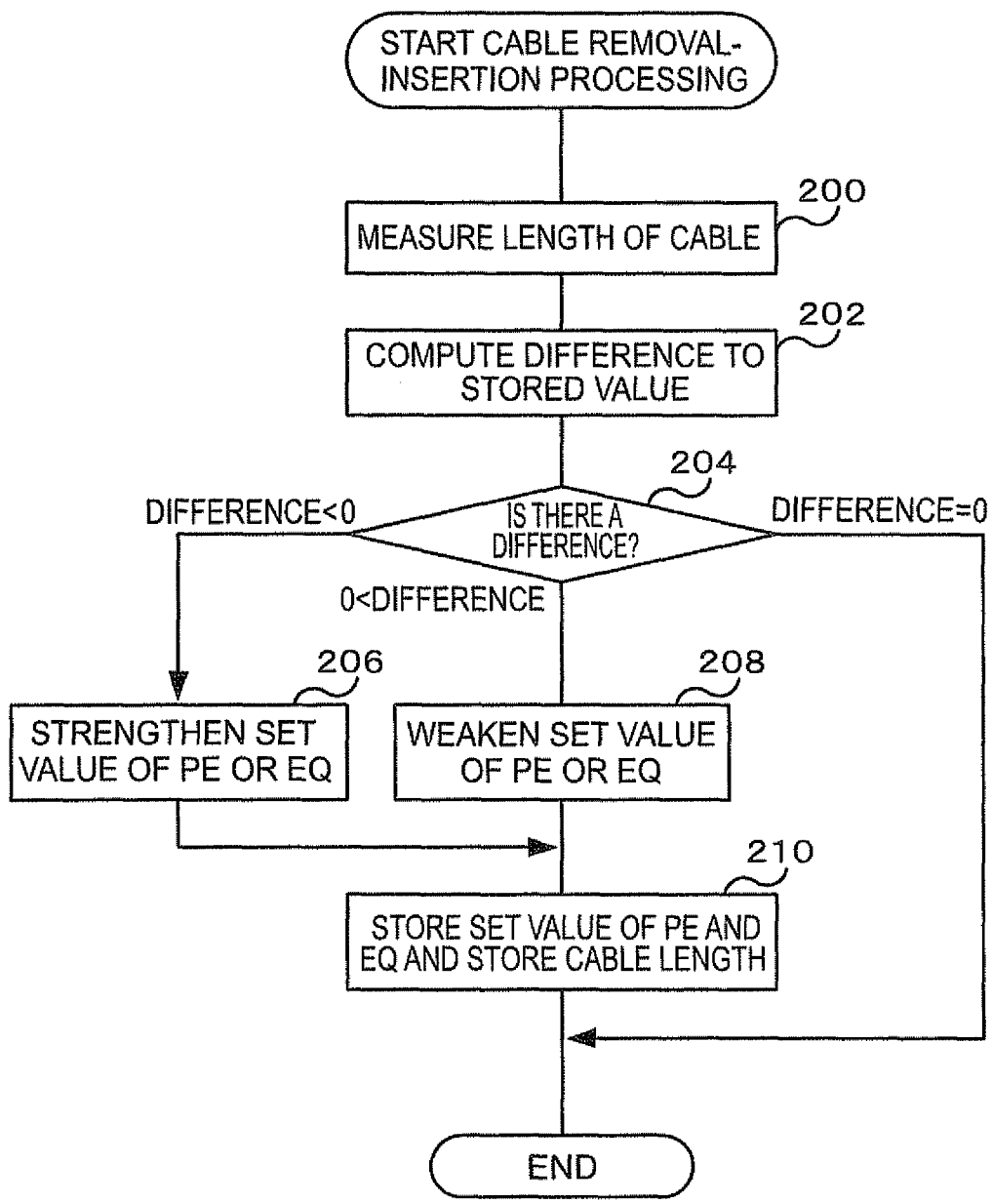
FIG. 5 is flow chart showing an example of cable removal-insertion processing according to the first exemplary embodiment.

When a cable 13 has been removed or inserted, determination is affirmative and the routine proceeds to step 132. At step 132, after processing for cable removal-insertion has been performed, the routine proceeds to step 138. A flow chart showing an example of cable removal-insertion processing is shown in FIG. 5.

At step 200, instruction is given for the transmission distance measuring section 23 to measure the length of the removed or inserted cable 13. At the next step 202, the difference is calculated between the length of the cable 13 that is stored in the transmission distance storage section 24 and the measured length of the cable 13.

At the next step 204, determination is made as to whether or not there is any amount of difference. When the difference is less than 0, the routine proceeds to step 206. When the difference is less than 0, the cable 13 has become longer, and after increasing the strength of the set value of the PE 31 and/or the EQ 49 at step 206, the routine proceeds to step 210. Note that, in the first exemplary embodiment, the set value of the PE 31 or the EQ 49 is strengthened (increased) by a predetermined value. Note that, the amount of increase in strength may be determined in consideration of the size of the difference in length.

Figure 6:
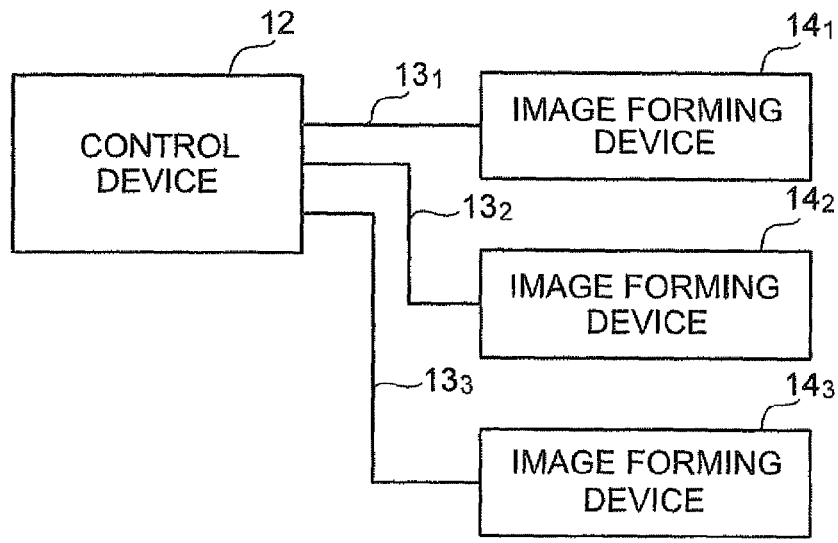
FIG. 6 is an explanatory diagram for explaining a relationship between a control device, cables, and image forming devices according to the first exemplary embodiment.
Figure 7:
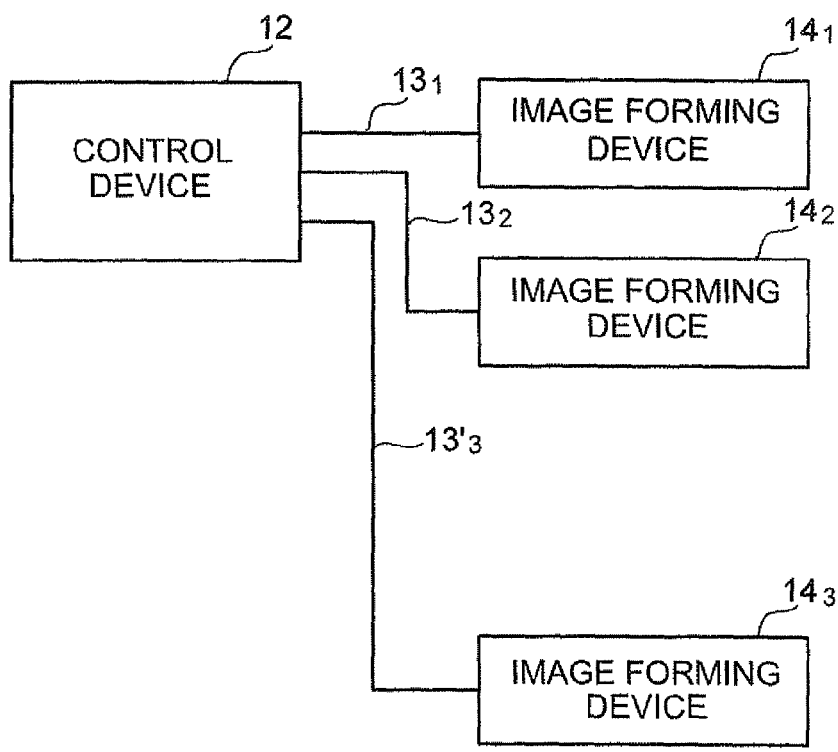
FIG. 7 is an explanatory diagram for explaining a relationship between a control device, cables, and image forming devices according to the first exemplary embodiment.

When the length of the cable 13 has become longer, then this is like the situation where the image forming system 10 shown in the schematic diagram of FIG. 6 has become the image forming system 10 shown in the schematic diagram of FIG. 7. Namely, in reality the length of the cable 13 itself has not become longer or shorter, but rather change has been made to a cable 13 of another length (cable $13'_3$ of FIG. 7), and the length of the transmission path has become longer. Similar applies to a case of becoming shorter.

On the other hand, when the difference is greater than 0, the routine proceeds to step 208. When the difference is greater than 0, since the cable 13 has become shorter, after weakening the set values of the PE 31 and/or EQ 49 in step 208, the routine proceeds to step 210. In the first exemplary embodiment, the set value of the PE 31 or the EQ 49 is weakened (decreased) by a predetermined value. The amount of weakening may be determined according to the size of the difference in length.

At the next step 210, the set values of the PE 31 and the EQ 49 that have been newly set are overwritten as the correction values stored in the correction value storage section 36. The present processing is thereby ended after storing the correction values in the storage section 36 at step 210.

When the difference is 0, since the length of the cable 13 has not changed, the present processing therefore ends.

Figure 8:
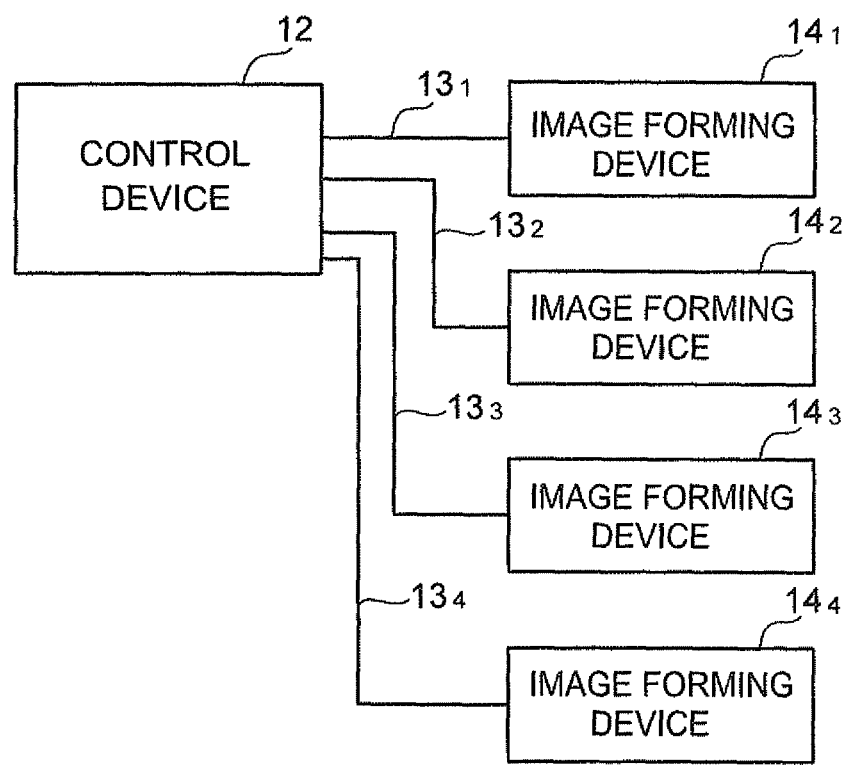
FIG. 8 is an explanatory diagram for explaining a relationship between a control device, cables, and image forming devices according to the first exemplary embodiment.

When it has been determined at step 130 that none of the cables have been removed or inserted, then determination is negative and the routine proceeds to step 134. At step 134 determination is made as to whether or not an image forming device 14 has been newly connected to the control device 12 (for example, whether or not the state has changed from that shown in FIG. 6 to the state shown in FIG. 8). In the first exemplary embodiment, when a new cable 13 has been connected (for example when the number of the connecting cables 13 has increased), determination is made that an image forming device 14 has been newly connected.

Figure 9:
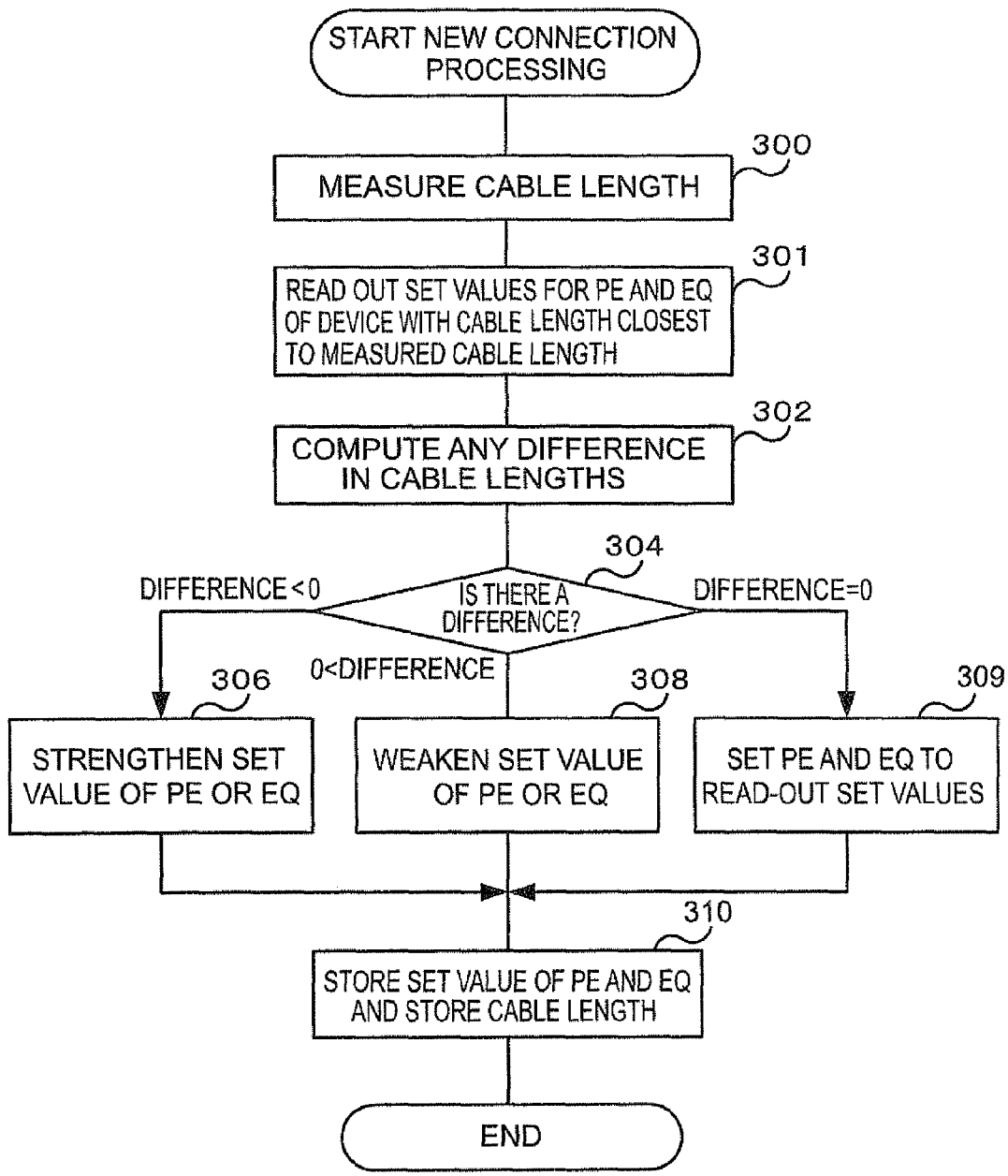
FIG. 9 is a flow chart showing an example of cable new connection processing in an image forming device according to a first exemplary embodiment.

When an image forming device 14 has been newly connected, determination is affirmative and the routine proceeds to step 136. Then, after performing processing for new connection, the routine proceeds to step 138. A flow chart of an example of processing for new connection is shown in FIG. 9.

At step 300, instruction is made for the transmission distance measuring section 23 to measure the length of the cable 13 of the newly connected image forming device 14. At the next step 302, the image forming device 14 whose length of cable 13 is closest to that of the measured cable 13 is read out from the transmission distance storage section 24, and the correction values of the PE 31 and the EQ 49 corresponding to this read-out image forming device 14 are read out from the correction value storage section 36.

At the next step 301, the difference between the length of the read-out cable 13 and the length of the measured cable 13 is calculated.

At the next step 304, determination is made as to whether or not there is any amount of difference. When the difference is less than 0, the routine proceeds to step 306. When the difference is less than 0, the length of the measured cable 13 is longer than the length of the read-out cable 13. Therefore, the set values of the PE 31 or the EQ 49 are increased in strength from the read-out set values, and set for the PE 31 and the EQ 49. After this, the routine proceeds to step 310. Note that, in the first exemplary embodiment, the set value is strengthened (increased) by a predetermined value. Note that, the amount of increase in strength of may be determined in consideration of the size of the difference in length.

On the other hand, when the difference is greater than 0, the routine proceeds to step 308. When the difference is greater than 0, the length of the measured cable 13 is shorter that the length of the read-out cable 13. Therefore, in step 308, the set values of the PE 31 and EQ 49 are weakened from the set values read-out and set for the PE 31 and the EQ 49. Then the routine proceeds to step 310. In the first exemplary embodiment, the set values are weakened (decreased) by a predetermined value. The amount of weakening may be determined according to the size of the difference in length.

When the difference is 0 the routine proceeds to step 309. When the difference is 0, the length of the measured cable 13 is equivalent to the length of the read-out cable 13. Therefore, after setting the set values that have been read out for the PE 31 and the EQ 49 for the PE 31 and the EQ 49 at step 309, the routine proceeds to step 310.

At the next step 310, the set values of the PE 31 and the EQ 49 that have been set by processing in whichever of step 306, step 308, or step 309, are stored in the correction value storage section 36. Also, the length of the cable 13 measured at step 300 is stored in the transmission distance storage section 24, and then the present processing is ended.

However, when determination is made at step 134 that there is no image forming device 14 newly connected to the control device 12, then determination is negative and the routine proceeds to step 138.

At step 138 determination is made as to whether or not the present processing is complete. When not complete, the routine returns to step 130, and the present processing is repeated. However, when it has been determined that a predetermined condition has occurred such as, for example, the power source of the control device 12 has been switched off, an energy saving mode has been entered, or the like, then the present processing is ended.

As explained above, in the first exemplary embodiment, the length of the cables 13 of the transmission path for transmitting signals from the control device 12 to the image forming devices 14 is measured by the transmission distance measuring section 23 for each of the image forming devices 14, and stored in the transmission distance storage section 24. The cable 13 with the shortest length is then selected, and the BER of a signal for transmission by this cable 13 is measured by the BER measuring section 26. Then, at least one or other of the PE 31 or the EQ 49 is changed by the correction value setting section 34. As a result of this, a correction value in the PE 31 or the EQ 49 is set such that the BER is the smallest possible value, and the set correction value is stored in the correction value storage section 36. The cable 13 with the next shortest length is then selected, and correction values are set by changing at least one or other of the PE 31 or the EQ 49 from the set values of the PE 31 and the EQ 49 set in the above setting process.

In the first exemplary embodiment, the transmission distance is measured by the transmission distance measuring section 23. Also, in the first exemplary embodiment, using the set values set for the PE 31 and the EQ 49 with the shortest cable 13 as reference set values, the BER measuring section 26 performs measuring on the other cables 13 from these reference values. Also, in the first exemplary embodiment, setting is performed with the set values strengthened or weakened according to the difference in length to that stored in the transmission distance storage section 24.

[Second Exemplary Embodiment]

Explanation will now be given of details of the present exemplary embodiment, with reference to the drawings. Note that a configuration of an image forming system of the second exemplary embodiment is substantially the same as that of the image forming system 10 of the first exemplary embodiment. Specifically, the second exemplary embodiment mainly differs from the first exemplary embodiment in the control device. Detailed explanation will therefore be given of the control device of the second exemplary embodiment, and detailed explanation of the other portions of the configuration will be omitted.

Figure 10:
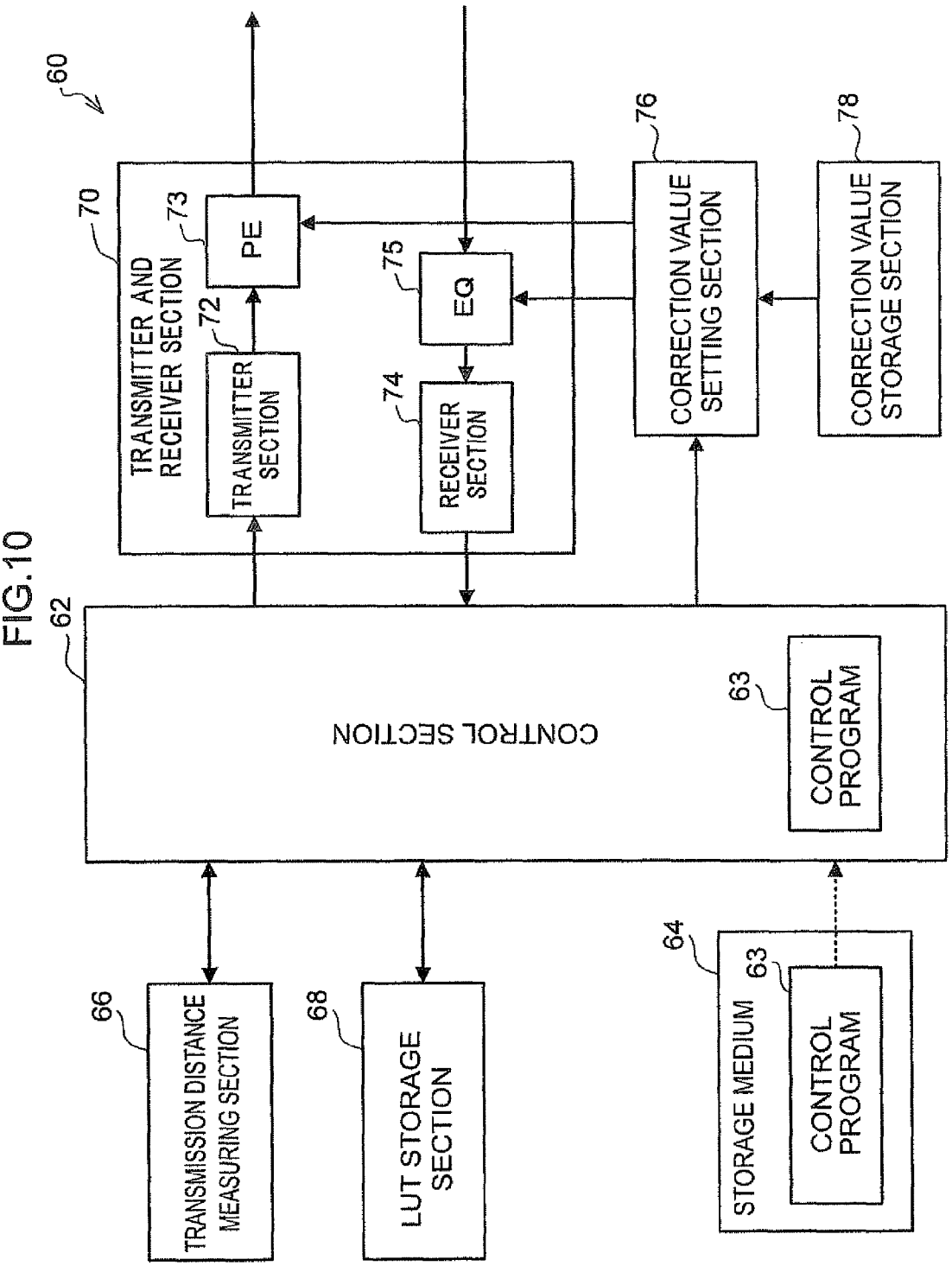
FIG. 10 is a functional block diagram showing an example of a schematic configuration of a control device in an image forming system according to a second exemplary embodiment.

A functional block diagram of an example of a schematic configuration of a control device of the second exemplary embodiment is shown in FIG. 10. The control device 60 of the second exemplary embodiment includes a control section 62, a transmission distance measuring section 66, a LUT storage section 68, a transmitter and receiver section 70, a correction value setting section 76, and a correction value storage section 78. The transmission distance measuring section 66, the correction value setting section 76, and the correction value storage section 78 of the second exemplary embodiment correspond to the transmission distance measuring section 23, the correction value setting section 34, and the correction value storage section 36 of the first exemplary embodiment, respectively.

A transmitter and receiver section 70, a transmitter section 72, a PE 73, a receiver section 74, and a EQ 75 of the second exemplary embodiment correspond to the transmission and receiver section 28, the transmitter section 30, the PE 31, the receiver section 32 and the EQ 33 of the first exemplary embodiment, respectively.

The control section 62 controls the control device 60 overall, and is configured, specifically, from a CPU, ROM, RAM or the like. A control program 63 for executing processing, described later, is stored in the control section 62. The second exemplary embodiment is configured with control program 63 stored in the control section 62 in advance. However, the second exemplary embodiment is not limited to the configuration described above. Configuration may be made with the control program 63 stored on a storage medium 64 or the like, such as a CD-ROM, removable disk or the like, with installation being performed by loading the control program 63 to the control section 62 from the storage medium 64.

The LUT storage section 68 of the second exemplary embodiment stores transmission distances (lengths of the cables 13), set values of the PE 73 and set values of the EQ 75 associated with each other in a LUT (Look Up Table, referred to as LUT below). In the second exemplary embodiment, the LUT is stored in the LUT storage section 68 in advance.

Figure 11:
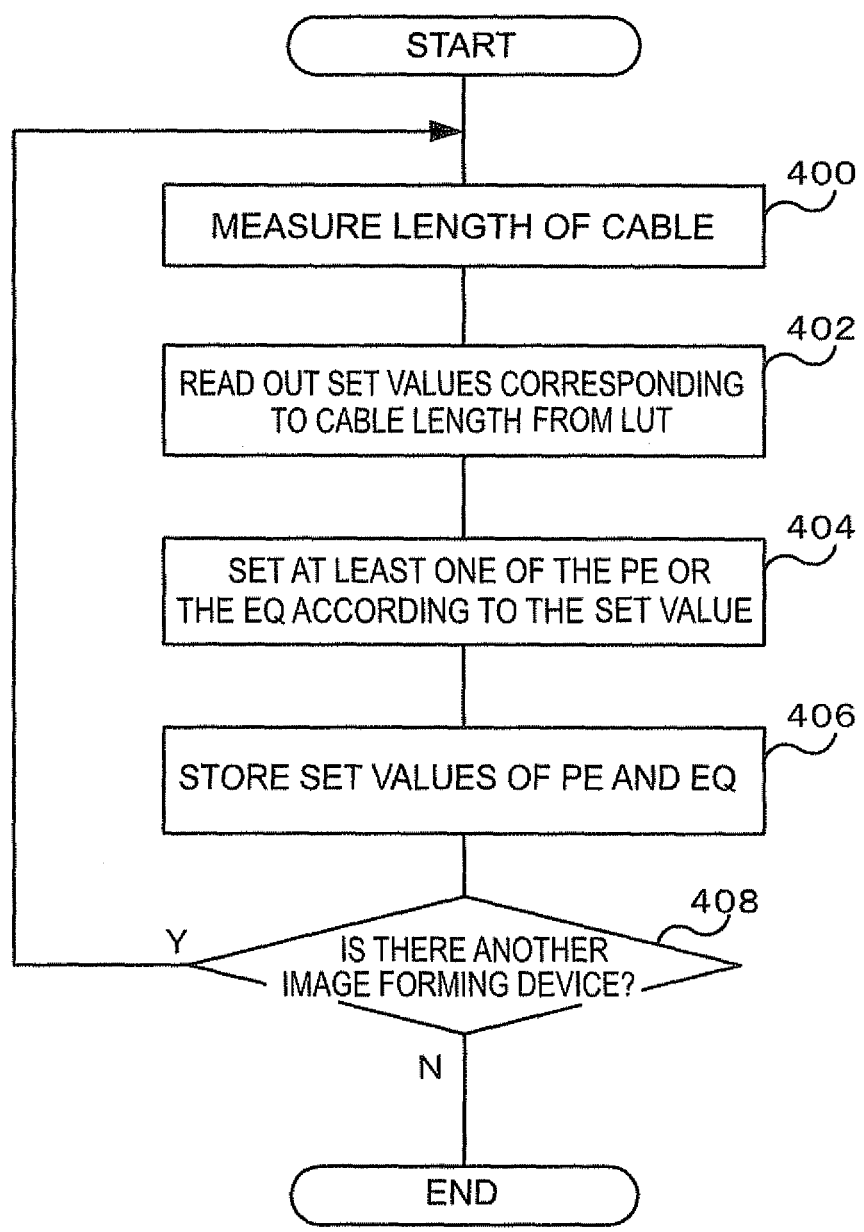
FIG. 11 is a flow chart showing an example of processing executed in a control section of a control device according to the second exemplary embodiment.

Explanation will now be given of processing, executed in the control section 62 of the control device 60 of the second exemplary embodiment, setting correction values for correcting signals for transmission. A flow chart showing a specific example of processing executed in the control section 62 is shown in FIG. 11. The present processing is executed in predetermined circumstances, such as when a power source (not shown in the drawings) is introduced to the control section 62, when a cable 13 is removed from or inserted into the control device 60, when a image forming device 14 is newly connected, or the like.

At step 400, one of the image forming devices 14 is selected and the length of the cable 13 that transmits a signal to the selected image forming device 14 is measured by the transmission distance measuring section 66.

At the next step 402, set values for the PE 31 and the EQ 49 corresponding to the measured length of the cable 13 are read out from the LUT storage section 68. At the next step 404, at least one of the PE 73 or the EQ 75 is set to the set value that has been read out. Note that configuration may be made such that both the PE 73 and the EQ 75 are set when an image forming device 14 has been newly connected. Also, configuration may be made such that one or other of the PE 73 or the EQ 75 (preferably the EQ 75) is set when a fine adjustment is made after once setting, when the length of the cable 13 (length of the transmission path) has been changed, or the like. In such cases the corresponding respective LUT's may be stored in the LUT storage section 68. Specific examples of such a LUT are shown in FIG. 12 and FIG. 13. The LUT shown in FIG. 12 is a specific example in a case where the EQ 75 alone is changed (set). The LUT shown in FIG. 13 is a specific example in a case where the PE 73 alone is changed (set). Note that when there is no set value in the LUT stored in the LUT storage section 68 for the measured length of cable 13, then the set value corresponding to the nearest length of cable 13 may be read out from the LUT.

At the next step 406, the correction values that are the set values of the PE 73 and the EQ 75 that have been set at step 404, are stored as in the correction value storage section 36. At the next step 408, determination is made as to whether or not there is one of the image forming devices 14 for which correction values have not yet been set. When one exists, determination is affirmative and the routine returns to step 400, and the present processing is repeated. However, when none exist, determination is negative and the present routine is ended.

As has been explained above, in the second exemplary embodiment, a LUT is stored in the LUT storage section 68 indicating the correspondence relationships between transmission distances (cable 13 length), the set values for the PE 73, and the set values for the EQ 75. Therefore, at least one of the set value for the PE 73 or the set value for the EQ 75 corresponding to the length of the cable 13 measured by the transmission distance measuring section 66, is read out from the LUT.

Note that the first exemplary embodiment and the second exemplary embodiment can be combined together. For example, as explained in the first exemplary embodiment, after setting the PE and EQ while measuring the BER, a slight adjustment may be made thereto using the LUT as described in the second exemplary embodiment.

The processing for setting the PE and the EQ is also not limited to the cases explained for the first exemplary embodiment and the second exemplary embodiment. The processing for setting the PE and the EQ may, for example, be performed when a power source is introduces to the image forming devices 14, or prior to commencement of image forming with the image forming device 14. The processing for setting the PE and the EQ may be executed when the cables 13 have not yet been used, for performing fine adjustment when heat is generated in the control device 12 or in the image forming device 14 (the temperature of the devices rises), or the like.

Figure 14:
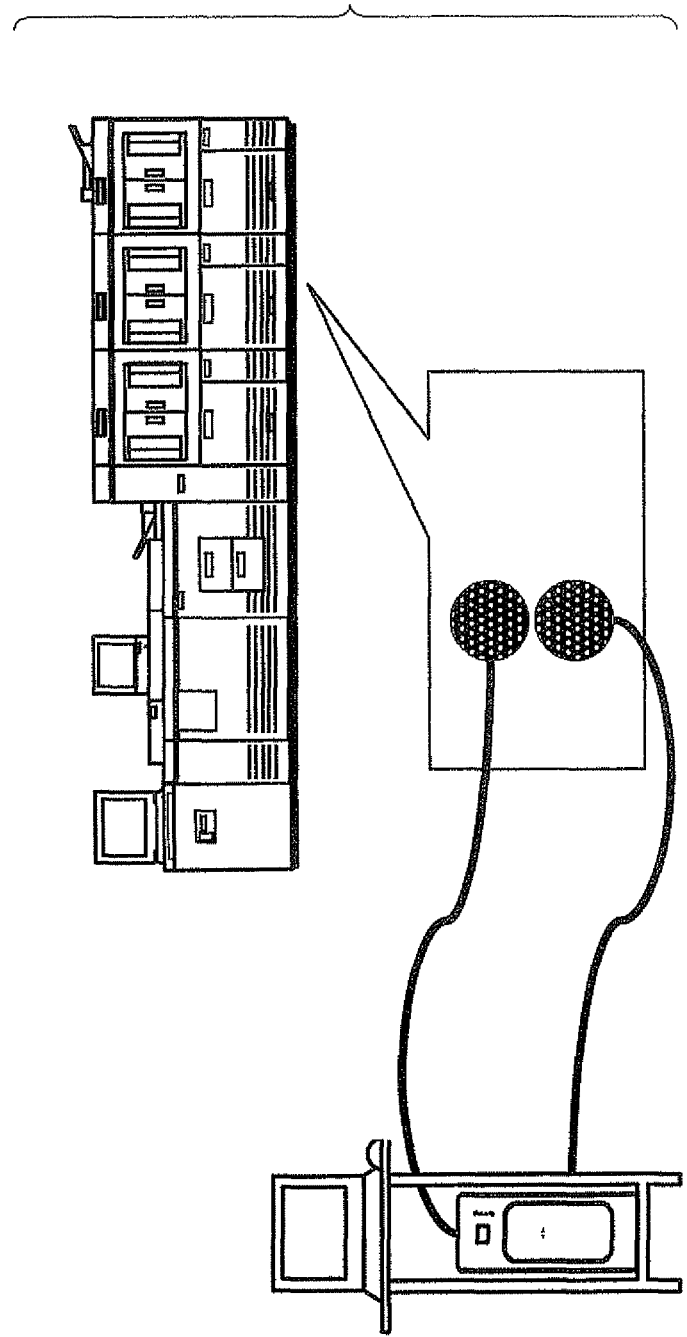
FIG. 14 is a configuration diagram showing an example of a schematic configuration of an image forming system according to another exemplary embodiment.
Figure 15:
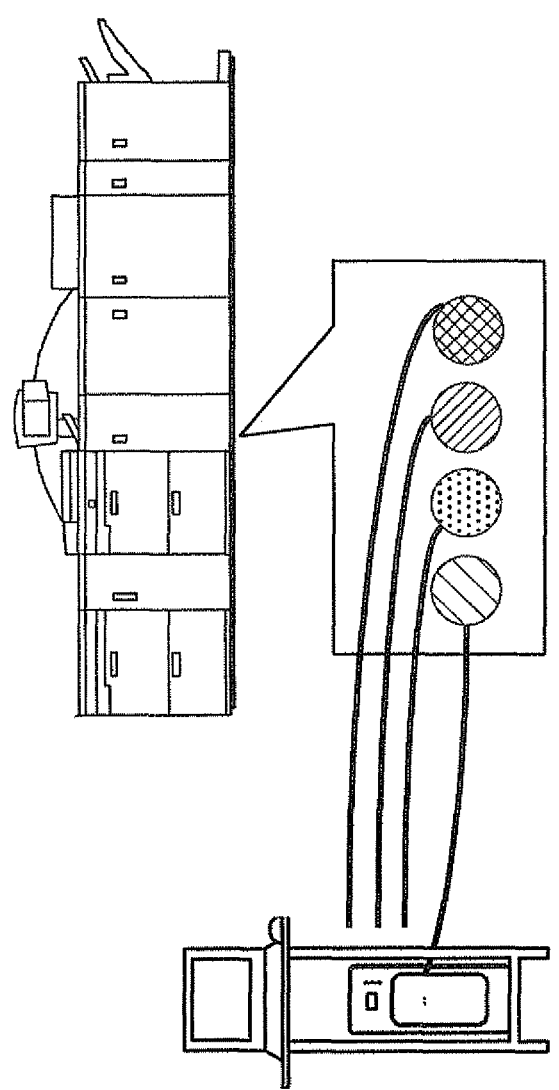
FIG. 15 is a configuration diagram showing an example of a schematic configuration of an image forming system according to another exemplary embodiment.

Explanation has also been given in the first exemplary embodiment and the second exemplary embodiment of cases where correction values are set according to the length of the cables 13 connected from the control device 12 to the receiver section 48 of the image forming device 14. However, the present invention is not limited thereto. For example, the image forming device 14 shown in FIG. 14 is of a case where the length of the path for transmission of a signal from the control device 12 differs according to whether the images are formed on the front face of a recording medium, or formed on the back face thereof. Therefore, correction values may be set respectively for the front face and for the back face. In the image forming device 14 shown in FIG. 15, the length of the path for transmission of a signal from the control device 12 differs for each of the colors of image being formed on a recording medium. Therefore, correction values may be set for each of the colors.

Also, in the first exemplary embodiment and the second exemplary embodiment, the distance of the cable 13 is measured. However, the present invention is not limited thereto. In another exemplary embodiment, the transmission time of a signal may be measured. In such cases, the length of the cable 13 as explained in the first exemplary embodiment and the second exemplary embodiment may be replaced with the transmission time, with other parts of the configuration similar to those of the first exemplary embodiment and the second exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication system comprising: a transmitter section that transmits a signal having a predetermined waveform; a plurality of receiver sections that receive the signal via signal transmission paths; a physical quantity measuring section that measures a physical quantity of the signal transmission path for each of the plurality of receiver sections, based on the transmission time of the signal from the transmitter section to the reception section; a correction section that corrects a signal received via the signal transmission path such that the signal received has the predetermined waveform, and corrects a signal transmitted from the transmitter section and outputs the signal to the signal transmission path such that the signal for output has the predetermined waveform; a setting section that sets, in the correction section, at least one of, a correction amount in accordance with the physical quantity for correcting a signal received via the signal transmission path, and/or a correction amount in accordance with the physical quantity for correcting a signal transmitted from the transmitter section and outputting to the signal transmission path; and an error measurement section that measures error of the signal received by the receiver section, wherein the setting section derives, as a standard correction amount, a correction amount corresponding to a given receiver section from the plurality of receiver sections based on error measured by the error measurement section in a signal received by the given receiver section, and the setting section derives a correction amount corresponding to another receiver section other than the given receiver section based on the standard correction amount and on a difference between the physical quantity corresponding to the given receiver section and the physical quantity corresponding to the other receiver section.

2. The communication system of claim 1, wherein the physical quantity corresponding to the given receiver section is smaller than the physical quantity corresponding to at least one of the other receiver section(s).

3. The communication system of claim 1, further comprising a correction amount storage section that stores a correspondence relationship between the physical quantity and the correction amount,
   wherein the setting section sets the correction amount corresponding to the physical quantity based on the correspondence relationship.

4. The communication system of claim 1, further comprising a physical quantity storage section that stores the physical quantity measured by the physical quantity measuring section,
   wherein, when the physical quantity corresponding to a given receiver section is different from the physical quantity already stored corresponding to the given receiver section, the setting section sets a correction amount based on the difference between the physical quantity measured by the physical quantity measuring section and the physical quantity stored in the physical quantity storage section.

5. A transmission device comprising: a transmitter section that transmits a signal having a predetermined waveform via signal transmission paths to one of a plurality of receiver sections; a physical quantity measuring section that measures a physical quantity of the signal transmission path for each of the plurality of receiver sections, based on the transmission time of the signal from the transmitter section to the receiver section; a correction section that corrects a signal received via the signal transmission path and corrects a signal transmitted from the transmitter section and outputs to the signal transmission path; a setting section that sets in the correction section at least one of a correction amount in accordance with a physical quantity for correcting the signal received via the signal transmission path such that the signal received has the predetermined waveform, and/or a correction amount in accordance with a physical quantity for correcting the signal transmitted from the transmitter section and outputting to the signal transmission path such that the signal for output has the predetermined waveform; and an error measurement section that measures error of the signal received by the receiver section, wherein the setting section derives, as a standard correction amount, a correction amount corresponding to a given receiver section from the plurality of receiver sections based on error measured by the error measurement section in a signal received by the given receiver section, and the setting section derives a correction amount corresponding to another receiver section other than the given receiver section based on the standard correction amount and on a difference between the physical quantity corresponding to the given receiver section and the physical quantity corresponding to the other receiver section.

6. A reception device comprising: a receiver section that receives a signal transmitted from a transmitter section via a signal transmission path; a physical quantity measuring section that measures a physical quantity of the signal transmission path for the receiver section, based on the transmission time of the signal from the transmitter section to the receiver section; a correction section that corrects a signal received via the signal transmission path using a correction amount in accordance with the physical quantity such that the signal received has a predetermined waveform; and a setting section that sets, in the correction section, a correction amount for a signal in accordance with the physical quantity; and an error measurement section that measures error of the signal received by the receiver section, wherein the setting section derives, as a standard correction amount, a correction amount corresponding to a given receiver section from the plurality of receiver sections based on error measured by the error measurement section in a signal received by the given receiver section, and the setting section derives a correction amount corresponding to another receiver section other than the given receiver section based on the standard correction amount and on a difference between the physical quantity corresponding to the given receiver section and the physical quantity corresponding to the other receiver section.

7. A non-transitory computer readable medium storing a program causing a computer to execute a process for setting a correction quantity, the computer being connected to a transmitter section that transmits a signal having a predetermined waveform to a plurality of receiver sections via signal transmission paths, a physical quantity measuring section that measures a physical quantity of the signal transmission paths, a correction section that corrects the signal received, and corrects the signal transmitted from the transmitter section and outputs to the signal transmission path, and a setting section that sets a correction amount in the correction section, the process comprising: measuring the physical quantity of the signal transmission path for each of the plurality of receiver sections based on the transmission time of the signal from the transmitter section to the receiver section; setting at least one of a correction amount in accordance with the physical quantity for correcting a signal received via the signal transmission path, and/or a correction amount in accordance with the physical quantity for correcting a signal transmitted from the transmitter section; correcting, in accordance with the set correction amount, a signal received via the signal transmission path such that the signal received has the predetermined waveform and correcting a signal transmitted from the transmitter section and outputting to the signal transmission path such that the signal for output has the predetermined waveform; and an error measurement section that measures error of the signal received by the receiver section, wherein the setting section derives, as a standard correction amount, a correction amount corresponding to a given receiver section from the plurality of receiver sections based on error measured by the error measurement section in a signal received by the given receiver section, and the setting section derives a correction amount corresponding to another receiver section other than the given receiver section based on the standard correction amount and on a difference between the physical quantity corresponding to the given receiver section and the physical quantity corresponding to the other receiver section.

8. A method of setting a correction amount in a communication system including a transmitter section that transmits a signal having a predetermined waveform to a plurality of receiver sections via signal transmission paths, a physical quantity measuring section that measures a physical quantity of the signal transmission paths, a correction section that corrects the received signal, and corrects the signal transmitted from the transmitter section and outputs to the signal transmission path, and a setting section that sets a correction amount in the correction section, the method comprising: measuring the physical quantity of the signal transmission path for each of the plurality of receiver, sections based on the transmission time of the signal from the transmitter section to the receiver section; setting at least one of a correction amount in accordance with the physical quantity for correcting a signal received via the signal transmission path, and/or a correction amount in accordance with the physical quantity for correcting a signal transmitted from the transmitter section; correcting, in accordance with the set correction amount, a signal received via the signal transmission path such that the signal received has the predetermined waveform, mad correcting the signal transmitted from the transmitter section and outputting to the signal transmission path such that the signal for output has the predetermined waveform; and an error measurement section that measures error of the signal received by the receiver section, wherein the setting section derives, as a standard correction amount, a correction amount corresponding to a given receiver section from the plurality of receiver sections based on error measured by the error measurement section in a signal received by the given receiver section, and the setting section derives a correction amount corresponding to another receiver section other than the given receiver section based on the standard correction amount and on a difference between the physical quantity corresponding to the given receiver section and the physical quantity corresponding to the other receiver section.

9. A non-transitory computer readable medium storing a transmission program causing a computer to execute a process, the process comprising: transmitting from a transmitter section a signal having a predetermined waveform to one of a plurality of receiver sections via signal transmission paths; measuring in a physical quantity measuring section a physical quantity of the signal transmission path for each of the plurality of receiver sections based on the transmission time of the signal from the transmitter section to the receiver section; setting using a setting section at least one of a correction amount in accordance with the physical quantity for correcting a signal received via the signal transmission path such that the signal received has the predetermined waveform, and/or a correction amount for correcting in accordance with the physical quantity a signal transmitted from the transmitter section and outputting to the signal transmission path such that the signal for output has the predetermined waveform, in a correction section that corrects a signal received via the signal transmission path and corrects a signal transmitted from the transmitter section and outputs to the signal transmission path; and an error measurement section that measures error of the signal received by the receiver section, wherein the setting section derives, as a standard correction amount, a correction amount corresponding to a given receiver section from the plurality of receiver sections based on error measured by the error measurement section in a signal received by the given receiver section, and the setting section derives a correction amount corresponding to another receiver section other than the given receiver section based on the standard correction amount and on a difference between the physical quantity corresponding to the given receiver section and the physical quantity corresponding to the other receiver section.

* * * * *